Jan. 15, 1946.                D. H. LARSEN                 2,393,174
        WELL DRILLING FLUID MATERIALS AND PROCESSES OF PREPARING THE SAME
                            Filed Aug. 12, 1942
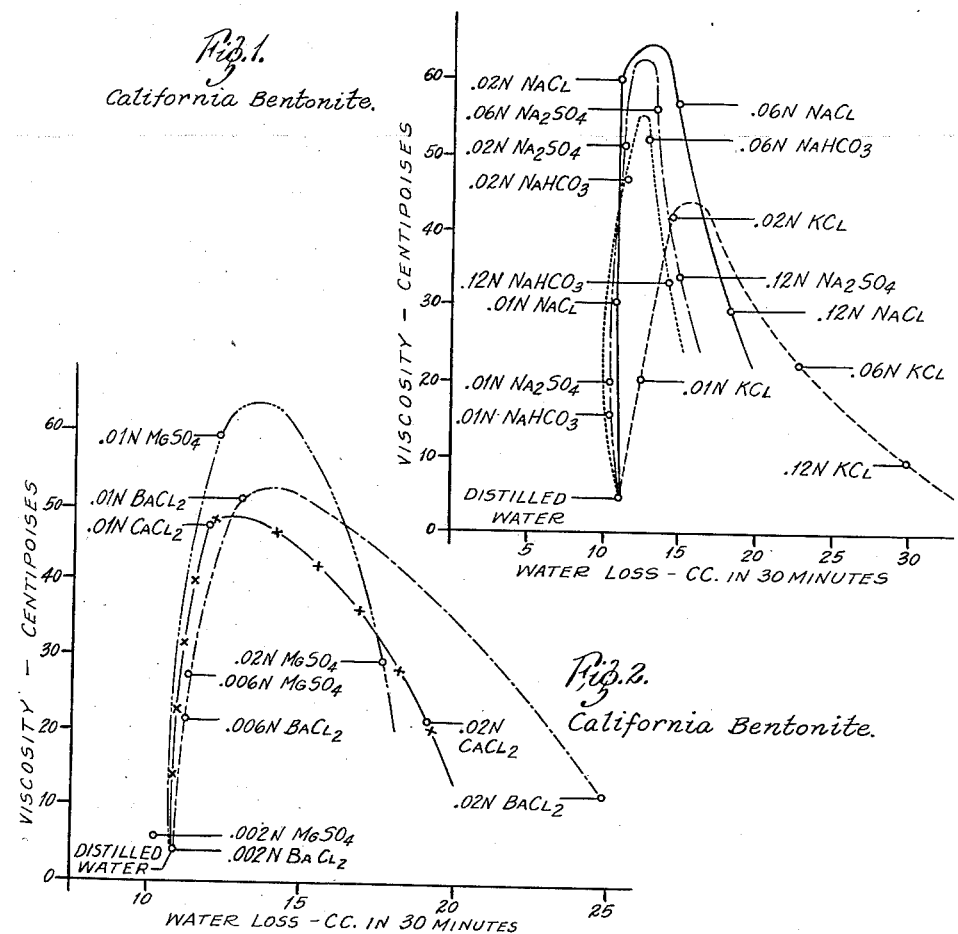
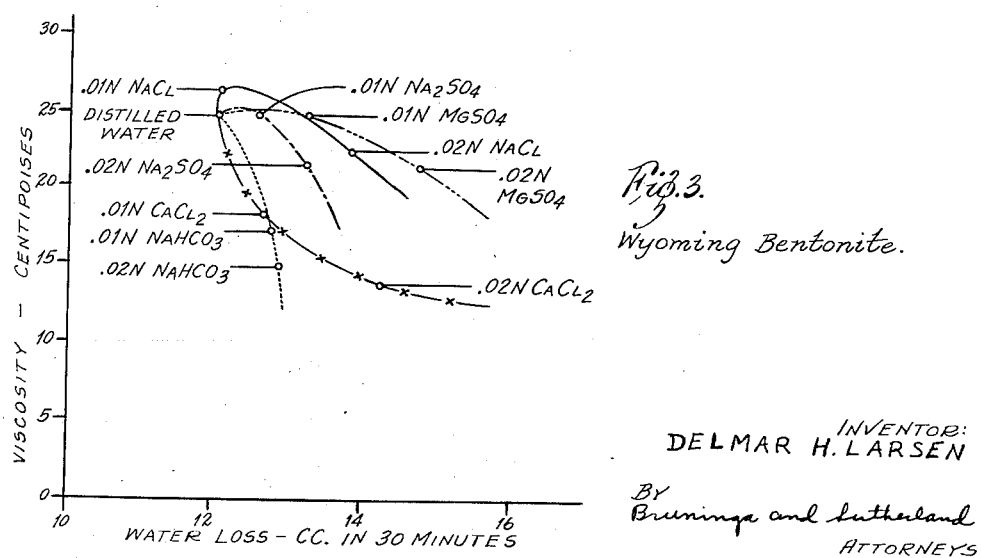
INVENTOR:
DELMAR H. LARSEN
BY
Bruninga and Sutherland
ATTORNEYS Patented Jan. 15, 1946

2,393,174

UNITED STATES PATENT OFFICE 2,393,174

WELL DRILLING FLUID MATERIAL AND PROCESS OF PREPARING THE SAME

Delmar H. Larsen, Los Angeles, Calif., assignor to National Lead Company, Los Angeles, Calif., a corporation of New Jersey Application August 12, 1942, Serial No. 454,627

8 Claims. (Cl. 252—8.5)

This invention relates to well drilling fluid materials, particularly of the emulsoid colloid type; that is, when agitated in water it results in permanent suspension and is characterized by water-absorption and swelling.

In the drilling of wells, particularly oil and gas wells, a drilling fluid or mud is employed, whose function it is to carry the cuttings and to wall the bore hole. Among the materials which have been found particularly suitable are emulsoid colloids such as a concentrated colloidal clay, viz., an alkali-metal gel-forming bentonite, described in the Harth Patent No. 1,991,637. Such a bentonite is of the reversible type, i. e., when hydrated it forms a gel but which can be dehydrated without destruction of the gel-forming properties.

In drilling muds, important single property is that of great "filter-cake" impermeability, or, as is more commonly thought of, a "low water loss" when the mud is filtered. While the viscosity characteristic or gelling power of an inefficient bentonite can be increased by caustic addition agents, these may disadvantageously affect its water-loss characteristics. Thus, the viscosity of a bentonite suspension can be sharply raised by the addition of such materials as magnesium oxide or Portland cement; but while such additions greatly increase the gelling power of the bentonite, they simultaneously affect the filter-cake permeability most adversely, giving rise to a high water loss.

In some cases it is difficult to secure an efficient gel with a reversible bentonite, and this may be due to any one or both of the following causes, namely; that either the bentonite or the water, or both, is or are deficient in water-soluble electrolytes. Such is the case with some of the California bentonites, and is also the case where the water contains only from 1 to 4 grains per gallon (17-68 parts per million) of the water-soluble electrolytes.

One of the objects of this invention is to provide a well drilling fluid material, which will have a good gel-forming characteristic at a low water-loss.

Another object is to provide a process of treating such a material to secure such result.

Another object is to provide a process of preparing a drilling fluid to secure such a result.

Further objects will appear from the detailed description in which will be set forth a number of embodiments; it is to be understood, however, that this invention is not limited to such embodiments.

In the accompanying drawing,

Figure 1 shows the effect of certain alkali-metal salts on the water loss and viscosity of suspensions of a typical California bentonite, such as can be beneficiated by the process embodying this invention.

Figure 2 shows the salutary effects of certain alkali-earth salts on the suspensions of the same bentonite.

Figure 3 shows the effects of both alkali-metal salts and alkali-earth salts on a suspension of a Wyoming bentonite which already contains sufficient electrolyte so that it does not have to be beneficiated by the process embodying this invention.

Generally stated, and in accordance with the illustrative embodiments of this invention, the objects are attained as follows: Where the bentonite is deficient in water-soluble electrolytes, there is added thereto or combined therewith a non-caustic electrolyte of a character and in an amount sufficient only to make up such deficiency and to substantially promote gelling thereof but without material increase of water-loss when an aqueous drilling fluid embodying such treated bentonite is made up and used. Where the water is deficient in such an electrolyte, the procedure is to add to the water employed for hydrating the bentonite, sufficient of the electrolyte to make up such deficiency and to substantially promote the gelling of the bentonite without material increase of water-loss. In general, where the summation of the total electrolyte content of both the bentonite and water is deficient, the procedure is to add sufficient of the electrolyte to secure the desired result.

The electrolyte, which may be employed, may be a salt, such as a monovalent salt, although some divalent salts can be used. Salts which are particularly useful, because economical, as well as effective, are sodium bicarbonate and sodium chloride; however, the potassium and ammonium salts may be employed. Other salts noted on the drawing are: sodium sulphate, magnesium sulphate, barium chloride, calcium chloride and potassium chloride. Any of these salts may be mixed with the ground bentonite and supplied, as such, for hydration. Where the water is deficient in the electrolyte the procedure is to add the salt to the water. The electrolyte may, however, be added to the bentonite and water.

The amount of electrolyte to be added can be determined as follows: Wyoming bentonite generally contains sufficient electrolyte to have a high gelling power in distilled water with a low water loss. The specific resistivity of such a suspension at 15 centipoises (Stormer at 600 R. P. M.) is 620 ohm-centimeters. The specific resistivity of a similar suspension of a typical California bentonite such as would be beneficiated by the process of this invention is about 1112 ohm-centimeters. Generally, therefore, a standard can be adopted as a 5½% suspension of 500 ohm-centimeters resistivity, above which the bentonite or the water in which it is hydrated may be said to be deficient in water-soluble electrolytes. If, therefore, 5½% of a given bentonite (such as California bentonite) and a given water, when mixed together, give a greater resistivity than 500 ohm-centimeters, then add sufficient of the electrolyte to reduce the resistivity to 500 ohm-centimeters.

The drawing shows the effect of various electrolytes on bentonite suspensions in distilled water and a designation, such as ".02N NaCl" indicates that the solution is a 2/100 normal solution. In all of these the percentage of bentonite was 5½% with water to make a total of 100%. In Figures 1 and 2 for California bentonite, the water was distilled water, as it was also in Figure 3 where the bentonite was Wyoming bentonite. In Figures 1 and 2 the resistivity of the suspension was 1112 ohm-centimeters. The abscissa and ordinates indicate the data shown. The viscosity was obtained by a Stormer instrument at 600 R. P. M. at 70° F. The water loss was determined in accordance with the method of the American Petroleum Institute. Of course, the higher the water loss, as determined by this method, the greater is the filter-cake permeability, and accordingly the less desirable is the drilling fluid or mud for drilling.

Figure 1 shows the striking effect of even small percentages of electrolyte on a California bentonite suspension in distilled water. The addition of the various electrolytes increase the viscosity characteristics or gelling power very rapidly without any material increase in water loss, provided, of course, that the amounts of electrolytes did not exceed the maxima noted on the drawing. This is even true of sodium bicarbonate, while even potassium chloride is practical. Figure 2 also shows that the alkaline earth salts were effective in California bentonite.

A reference to Figure 3 will show that the effects of various electrolytes on Wyoming bentonites in suspension in distilled water result in no improvement; in fact, in all cases except for sodium chloride, at a very small percentage, the effect was harmful in that the water loss was increased rather than decreased. This is due to the fact that, as noted above, Wyoming bentonite has a high gelling power, even in distilled water with low water loss. The specific resistivity of the Wyoming bentonite suspension employed here was 620 ohm-centimeters in distilled water and was reduced to only 404 ohm centimeters by adding 1/100 normal solution of sodium chloride. On the other hand, in Figure 1 the same amount of sodium chloride increased the viscosity by more than seven times without materially affecting the water loss and reduced the resistivity to 575 ohm centimeters.

It will, therefore, be seen that the invention accomplishes its objects. While it does not necessarily enable a bentonite deficient in electrolyte to be better, in both gelling power and water loss, than an electrolyte-rich bentonite, it does enable a bentonite deficient in electrolyte to be, at least, equal to a bentonite not deficient in electrolyte, in its characteristic of efficient viscosity or gelling power at a low water loss.

It will be understood that this invention is susceptible of various embodiments within the scope of the appended claims without departing from the spirit of this invention.

Having thus described the invention, what is claimed is:

1. A well-drilling fluid material, comprising, a reversible concentrated colloidal clay, viz., an alkali-metal gel-forming bentonite which itself is deficient in water-soluble electrolytes and containing an added non-caustic electrolyte of a character and in an amount sufficiently only to make up such deficiency and to substantially promote gelling of the bentonite but without material increase of water-loss.

2. A well-drilling fluid material, comprising, a reversible alkali-metal bentonite which itself is deficient in water-soluble electrolytes and containing an added non-caustic electrolyte of a character and in an amount sufficient only to make up such deficiency and to substantially promote gelling of the bentonite but without material increase of water-loss.

3. A well-drilling fluid material, comprising, a reversible alkali-metal bentonite which itself is deficient in water-soluble electrolytes but which contains a small percentage of an added non-caustic water-soluble salt of a character and sufficient only to make up such deficiency and to substantially promote gelling of the bentonite without material increase of water-loss.

4. The process of treating bentonite, comprising, adding to a reversible alkali-metal bentonite which itself is deficient in water-soluble electrolytes, a non-caustic electrolyte of a character and in an amount sufficient only to make up such deficiency and to substantially promote gelling of the bentonite.

5. The process of treating bentonite, comprising, adding to a reversible alkali-metal bentonite deficient in water-soluble electrolytes, a non-caustic electrolyte of a character and in an amount sufficient only to make up such deficiency and to substantially promote gelling of the bentonite without material increase of water-loss.

6. The process of treating bentonite, comprising, adding to a reversible alkali-metal bentonite which is deficient in water-soluble electrolytes, a small percentage of a non-caustic water-soluble salt, viz., sufficient only to overcome such deficiency and to substantially promote gelling of the bentonite without material increase of water-loss.

7. The process of preparing a drilling fluid of water and of a reversible concentrated colloidal clay, viz., an alkali-metal bentonite, comprising, adding to a water deficient in water-soluble electrolytes, an electrolyte of a character and in an amount sufficient only to overcome such deficiency and to substantially promote gelling of the bentonite without material increase of water-loss.

8. The process of preparing a drilling fluid of water and a reversible alkali-metal bentonite, comprising, adding to such a water-bentonite fluid when deficient in water-soluble electrolytes, an electrolyte of a character and in an amount sufficient only to overcome such deficiency and to substantially promote gelling of the bentonite without material increase of water-loss.

DELMAR H. LARSEN.